United States Patent
DeKoning et al.

(10) Patent No.: US 6,553,511 B1
(45) Date of Patent: Apr. 22, 2003

(54) MASS STORAGE DATA INTEGRITY-ASSURING TECHNIQUE UTILIZING SEQUENCE AND REVISION NUMBER METADATA

(75) Inventors: Rodney A. DeKoning, Augusta, KS (US); Thomas L. Langford, II, Wichita, KS (US); Scott E. Greenfield, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/573,058

(22) Filed: May 17, 2000

(51) Int. Cl.$^7$ ................................. G06F 11/00
(52) U.S. Cl. ..................... 714/6; 714/52; 714/770; 707/100
(58) Field of Search ................. 714/6, 52, 770, 714/54; 707/100

(56) References Cited

U.S. PATENT DOCUMENTS

| | | | | |
|---|---|---|---|---|
| 5,504,858 A | * | 4/1996 | Ellis et al. | 714/6 |
| 5,774,643 A | * | 6/1998 | Lubbers et al. | 714/20 |
| 5,862,406 A | * | 1/1999 | Matsumoto et al. | 710/19 |
| 6,195,761 B1 | * | 2/2001 | Kedem | 714/6 |
| 6,298,425 B1 | * | 10/2001 | Whitaker et al. | 711/162 |
| 6,378,038 B1 | * | 4/2002 | Richardson et al. | 711/114 |

OTHER PUBLICATIONS

Symbios Logic, RAID Glossary Data Sheet—Knowing the Lingo, 1997.

* cited by examiner

Primary Examiner—Robert Beausoliel
Assistant Examiner—Yolanda L. Wilson
(74) Attorney, Agent, or Firm—John R. Ley, LLC

(57) ABSTRACT

Sequence number metadata which identifies an input/output (I/O) operation, such as a full stripe write on a redundant array of independent disks (RAID) mass storage system, and revision number metadata which identifies an I/O operation such as a read modify write operation on user data recorded in components of the stripe, are used in an error detection and correction technique, along with parity metadata, to detect and correct silent errors arising from inadvertent data path and drive data corruption. An error arising after a full stripe write is detected by a difference in sequence numbers for all of the components of user data in the stripe. An error arising after a read modify write is detected by a revision number which occurred before the correct revision number. The errors in both cases are corrected by using the parity metadata for the entire collection of user data and the correct information from the other components of the user data and metadata, and applying this information to an error correcting algorithm. The technique may be executed in conjunction with a read I/O operation without incurring a substantial computational overhead penalty.

21 Claims, 8 Drawing Sheets

| UCBR A R=A S=X | U DATA CACHE BLK A BLKS 1-8 | UCBR B R=A S=X | U DATA CACHE BLK B BLKS 9-16 | UCBR C R=A S=X | U DATA CACHE BLK C BLKS 17-24 | UCBR D R=A S=X | U DATA CACHE BLK D BLKS 25-32 |
|---|---|---|---|---|---|---|---|
| 78a 80a | 72a | 78b 80b | 72b | 78c 80c | 72c | 78d 80d | 72d |
| UCBR A R=B S=X | U DATA CACHE BLK A BLKS 33-40 | UCBR B R=B S=X | U DATA CHCHE BLK B BLKS 41-48 | UCBR C R=B S=X | U DATA CACHE BLK C BLKS 49-56 | UCBR D R=B S=X | U DATA CACHE BLK D BLKS 57-64 |
| UCBR A R=C S=X | U DATA CACHE BLK A BLKS 65-72 | UCBR B R=C S=X | U DATA CACHE BLK B BLKS 73-80 | UCBR C R=C S=X | U DATA CACHE BLK C BLKS 81-88 | UCBR D R=C S=X | U DATA CACHE BLK D BLKS 89-96 |
| UCBR A R=D S=X | U DATA CACHE BLK A BLKS 97-104 | UCBR B R=D S=X | U DATA CACHE BLK B BLKS 105-112 | UCBR C R=D S=X | U DATA CACHE BLK C BLKS 113-120 | UCBR D R=D S=X | U DATA CACHE BLK D BLKS 121-128 |
| PCBR A 1,33,65, 97;ETC R=U1,U2,U3,U4 S=X | PARITY CACHE BLK A 1,33,65,97; 2,34,66, 98;ETC | PCBR B 9,41,73, 105;ETC R=U1,U2,U3,U4 S=X | PARITY CACHE BLK B 9,41,73,105; 10,42,74, 106;ETC | PCBR C 17,49,81, 113;ETC R=U1,U2,U3,U4 S=X | PARITY CACHE BLK C 17,49,81,113; 18,50,82, 114;ETC | PCBR D 24,57,89, 121;ETC R=U1,U2,U3,U4 S=X | PARITY CACHE BLK D 24,57,89,121; 25,58,90, 122;ETC |

FIG.9

MASS STORAGE DATA INTEGRITY-ASSURING TECHNIQUE UTILIZING SEQUENCE AND REVISION NUMBER METADATA

CROSS REFERENCE TO RELATED APPLICATION

This invention is related to an invention for Data Structures Containing Sequence and Revision Number Metadata Used in Data Integrity-Assuring Technique described in U.S. patent application Ser. No. (09/573,235) filed concurrently herewith. This concurrently filed application is assigned to the same assignee as this invention is assigned. The subject matter of this concurrently filed application is incorporated herein by this reference.

BACKGROUND OF THE INVENTION

This invention relates to mass information storage systems used in high-performance computer systems. More particularly, this invention relates to a new and improved technique of using sequence number and revision number metadata for assuring high data integrity against data path errors or drive data corruption errors which may inadvertently occur during the transfer of data to, or the retrieval of data from storage media, such as a redundant array of independent disks (RAID) mass storage system.

In high-performance computer systems, a mass storage system must be capable of rapidly supplying information to each processor of the computer system in a "read" operation, rapidly transferring information for storage in a "write" operation, and performing both read and write operations with a high level of integrity so that the information is not corrupted or lost. Incorrect, corrupted or lost information defeats or undermines the effectiveness of the computer system. The reliability of the information is an absolute necessity in most if not all business computing operations.

A variety of high-performance mass storage systems have been developed to assure rapid information storage and retrieval operations. The information storage and retrieval operations are generally the slowest operations performed by computer system, consequently the information storage and retrieval operations limit the speed and functionality of the computer system itself.

One popular mass storage system which offers relatively rapid information storage and retrieval capabilities at moderate cost, as well as the capability for assuring a relatively high integrity of the information against corruption and loss, is a redundant array of independent or inexpensive disks (RAID) mass storage system. In general, a RAID mass storage system utilizes a relatively large number of individual, inexpensive disk drives which are controlled separately and simultaneously. The information to be written is separated into smaller components and recorded simultaneously or nearly simultaneously on multiple ones of the disk drives. The information to be read is retrieved almost simultaneously in the smaller components from the multiplicity of disk drives and then assembled into a larger total collection of information requested. By separating the total information into smaller components, the time consumed to perform reading and writing operations is reduced. On the other hand, one inherent aspect of the complexity and speed of the read and write operations in a RAID mass storage system is an increasing risk of inadvertent information corruption and data loss arising from the number of disk drives and the number and complexity of the input/output (I/O) operations involved.

Various error correction and integrity-assuring software techniques have been developed to assure that inadvertent errors can be detected and that the corrupted information can be corrected. The importance of such integrity-assuring techniques increases with higher performance mass storage systems, because the complexity of the higher performance techniques usually involve an inherent increased risk of inadvertent errors. Some of these integrity-assuring techniques involve the use of separate software which is executed concurrently with the information storage and retrieval operations, to check and assure the integrity of the storage and retrieval operations. The use of such separate software imposes a performance penalty on the overall functionality of the computer system, because the concurrent execution of the integrity-assuring software consumes computer resources which could otherwise be utilized for processing, reading or writing the information. Another type of integrity-assuring technique involves attaching certain limited metadata to the data to be written, but then requiring a sequence of separate read and write operations involving both the new data and the old data. The number of I/O operations involved diminish performance of the computer system. Therefore, it is important that any integrity-assuring software impose only a small performance degradation on the computer system. Otherwise the advantages of the higher performance mass storage and computing system will be lost or diminished.

Although the integrity-assuring software techniques used in most mass storage systems are reliable, there are a few classes of hardware errors which seem to arise inadvertently and which are extremely difficult to detect or correct on a basis which does not impose a performance degradation. These types of errors seem prone to occur to the disk drives, almost inexplicably. One example of this type of an error involves the disk drive accepting information in a write request and acknowledging that the information has been correctly written, without actually writing the information to the storage media. Another example involves the disk drive returning information in response to a read request that is from an incorrect disk memory location. A further example involves the disk drive writing information to the wrong address location. These types of errors are known as "silent" errors, and are so designated because of the apparent, but nevertheless incorrect, accuracy of the operations performed.

The occurrence of silent errors is extremely rare. However, such errors must be detected and/or corrected in computer systems where absolute reliability of the information is required. Because of the extremely infrequent occurrence of such silent errors, it is not advantageous to concurrently operate any integrity-assuring software or technique that imposes a continuous and significant penalty of performance degradation on the normal, error-free operations of the computer system.

Apart from silent errors, there are other situations in which data and parity inconsistency are detected due to incomplete write operations, failed disk input/output (I/O) operations or other general firmware and hardware failures. In such circumstances, it is desirable to utilize a technique to make determinations of consistency in the data and parity. Parity is additional information that is stored along with the data that defines the data and allows for reconstruction of the data. By knowing either the correct data or the correct parity, it is possible to correctly regenerate the correct version of incorrect data or parity. While a variety of integrity-assuring software techniques are available to regenerate the correct data or the correct parity, it is desirable to avoid the performance degradation penalty by continually executing separate software to continuously check data and parity.

It is with respect to these and other background considerations that the present invention has evolved.

SUMMARY OF THE INVENTION

The present invention involves creating a sequence number and a revision number and storing the sequence number and revision number as metadata along with the data itself in a mass storage system, such as a RAID system. The invention also involves utilizing the sequence number and the revision number in an effective way which does not impose a significant performance degradation penalty on the computer system or the mass storage system to detect and correct silent errors and errors of data and parity inconsistency.

One aspect of the present invention pertains to a method of creating metadata from user data to detect errors arising from input/output (I/O) operations performed on information storage media contained in a mass storage system. The method involves creating at least two user data structures and a parity data structure. Each user data structure contains user data and metadata which describes the user data contained in that same user data structure. The parity data structure is associated with the two or more user data structures and contains metadata and parity information which describes separately and collectively the user data and metadata in each of the two or more user data structures. A sequence number and a revision number are included as part of the metadata in each user data structure and are also included in the parity data structure as correlations to the same information in each user data structure. The sequence number identifies a full stripe write I/O operation in which the information in the user data structures and the parity data structure was written. The revision number identifies a subsequent I/O operation, such as a read modify write I/O operation, in which the user data in one user data structure in a stripe is written apart from writing the user data in the other user data structures of the same stripe. The parity information in the parity data structure describes the parity of the collective user data in both of the user data structures.

Using the information recorded in the user data structures and the parity data structure, another aspect of the invention involves detecting errors arising from I/O operations. The sequence numbers are read from one user data structure and from the parity data structure during a subsequent I/O operation, and a determination is made of whether the sequence numbers match. If the sequence numbers do not match, the sequence number is read from one other user data structure written during the full stripe write operation, and a correct sequence number is determined as that sequence number which is equal to the two matching ones of the three sequence numbers. Another aspect of the invention involves correcting the detected errors in the user data structure by using the user data from each user data structure having the correct sequence number and the parity information from the parity data structure to construct the correct user data and metadata information for the user data structure which has the incorrect sequence number. An aspect of the invention also involves correcting detected errors in the parity data structure by using the user data from the user data structures having the correct sequence numbers to construct the correct metadata and parity information for the parity data structure. In these cases, the constructed correct information is written to the user data structure or the parity data structure before executing the subsequent I/O operation.

Silent errors arising from drive data and data path corruption of some of the user data written in a full stripe write operation are detected in the manner described when the corrupted user data information is read. By establishing the sequence number and using it to detect the portion of full stripe write operation which has been corrupted, and by using the parity information in the parity data structure, that corrupted portion of the information is corrected and replaced by the correct information derived from the metadata and user data of each other user data structure and the parity data structure of the full stripe write.

By using the revision number metadata recorded in the user data structures and the parity data structure, another aspect of the invention involves detecting errors arising from previous read modify write (RMW) operations, prior to executing a subsequent RMW or read operation. As a part of the subsequent RMW or read operation, the revision number is read from the user data structure to which the RMW operation is addressed and from the parity data structure. If the sequence numbers match, a determination then is made of whether the revision numbers from the user data structure and the parity data structure match. If the revisions numbers do not match, the revision number which is indicative of a later-occurring subsequent I/O operation is attributed as the correct revision number. Thereafter, before executing the subsequent RMW or read operation, the previously-occurring errors which have been detected by the mismatch of the revision numbers are corrected, in accordance with another aspect of the invention. If the revision number from the parity data structure is not the correct revision number, the correct metadata and parity information for the parity data structure is constructed from the user data and metadata of the user data structures of the full stripe. On the other hand, if the revision number read from one of the user data structures is less than the correct revision number, the correct user data for that user data structure is constructed from the user data read from each other user data structure and from the parity information read from the parity data structure of the full stripe. In these cases, the constructed correct information is written to the user data structure or the parity data structure before executing the subsequent RMW or read operation. Silent errors in data path and drive data corruption are thereby corrected in this manner. The revision number metadata may be a relatively small field, in which case it is necessary to account for the wrapping of the numbers in the small field when determining the correct later-occurring revision number.

The present invention is preferably implemented in a RAID mass storage system having a plurality of disk drives. The plurality of user data structures and the parity data structure of the full stripe write are preferably written on separate disk drives. The present invention may be implemented on different levels of RAID mass storage systems, including RAID 1 systems where entire mirroring of data occurs. In RAID 1 systems, either the sequence number or revision number are used, but both are not required.

By associating metadata including the sequence number and the revision number with all of the data stored and retrieved, the data is protected against data path and disk drive alteration on a continuous basis. The protection, detection and correction features are derived as an inherent aspect of a read command directed to the information in question. Because errors rarely occur (even though the errors are serious when they do occur) there is little or no performance penalty arising from continuously running a data-assuring program concurrently with the normal operation of the mass storage system. The error detection and correction aspects of the present invention are implemented as a part of the read operation itself, and any corrections are accomplished before any new information is written. The present invention provides an effective method for both detecting and correcting errors.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 6 is an expanded illustration of a full stripe write shown in FIG. 3, formed by four user data structures shown in FIG. 4 and one parity data structure shown in FIG. 5.

FIG. 7 is an illustration of a memory layout data structure resulting from partitions into standard sector sizes to accommodate the cache block region and the control block region of the user data structures and parity data structure, shown in FIGS. 4 and 5, in the full stripe write shown in FIG. 6.

FIG. 8 is an illustration of another memory layout data structure resulting from partitions of standard sector sizes to accommodate the cache block region and the control block region of the user data structures and parity data structure, shown in FIGS. 4 and 5, in the full stripe write shown in FIG. 6.

FIG. 9 is an illustration of a further memory layout data structure resulting from partitions of standard sector sizes to accommodate the cache block region and the control block region of the user data structures and parity data structure, shown in FIGS. 4 and 5, in the full stripe write shown in FIG. 6.

DETAILED DESCRIPTION

Figure 1:
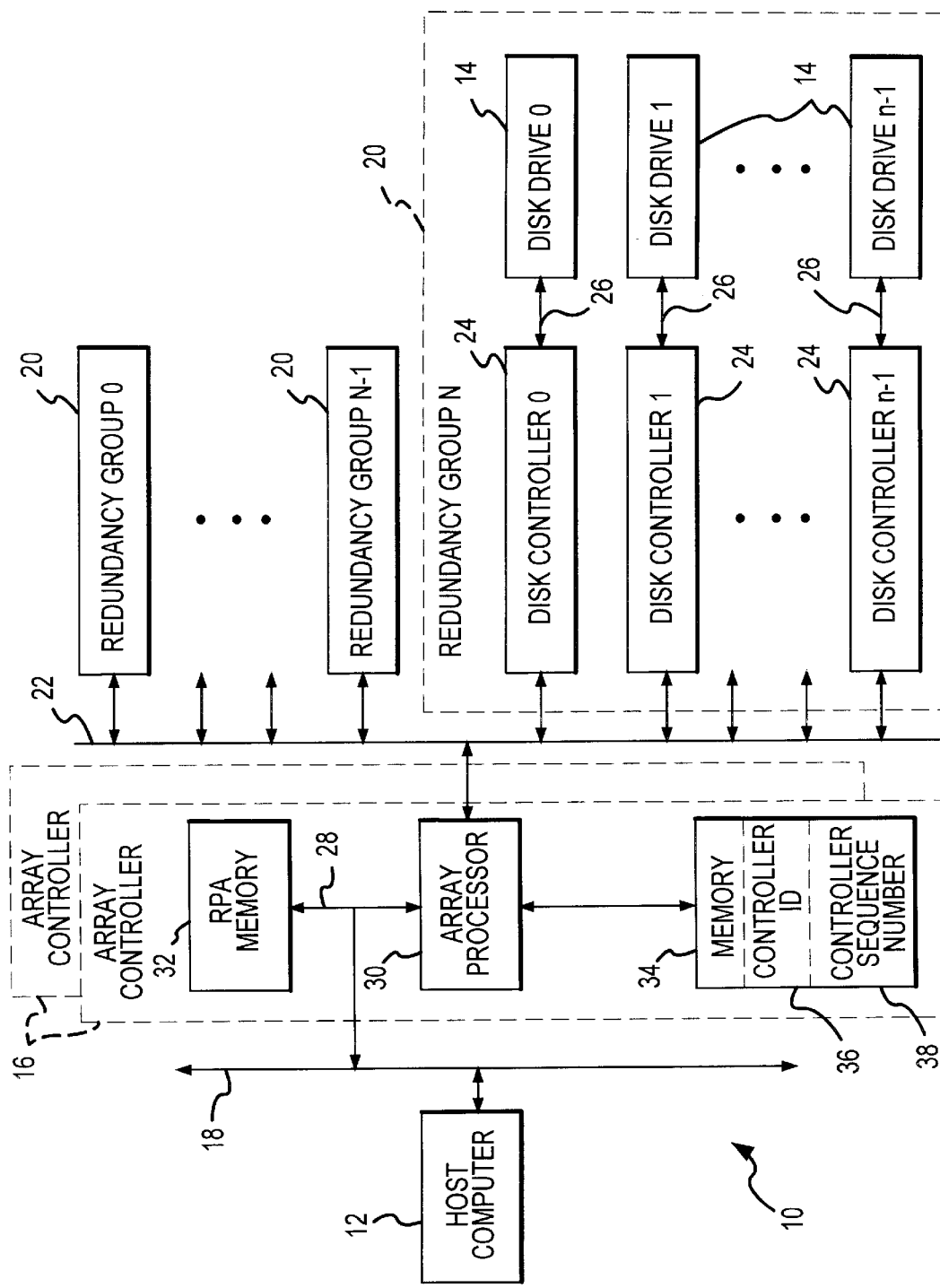
FIG. 1 is a block diagram of a typical RAID mass storage system connected to a host computer, in which the present invention is incorporated.

The present invention is advantageously incorporated in a RAID mass storage system 10 which is used in conjunction with one or more host computers 12, as shown in FIG. 1. Although the present invention is believed to be most advantageously applicable to RAID mass storage systems 10, including all levels of RAID mass storage systems, it also has applicability to other types of mass storage systems in which a plurality of disk drives 14 or other information recording and retrieval media such as tape or optical media are employed.

The RAID mass storage system 10 includes a plurality of redundant array controllers 16 which are connected to the host computer 12 by a host bus 18. The array controllers 16 (two are shown in FIG. 1) are also connected to a plurality of redundancy groups 20 by an array bus 22. Typically, a plurality (not shown) of array buses 22 connect the array controllers 16 to the redundancy groups 20. It is over each array bus 22 that read and write commands and the data to be read or written is transferred between each redundancy group 20 and the array controller 16. It is over the host bus 18 that read and write commands and the data to be read or written is transferred between the array controllers 16 and the host computer 12.

Each redundancy group 20 includes at least one, and most usually a plurality of disk drives 14, as an information mass storage unit for information storage and retrieval. Each redundancy group 20 includes a disk controller 24 connected to each disk drive 14. Each disk controller 24 is connected to the array bus 22 and receives the data and the read and write commands addressed to it by the array controllers 16. In response to the read and write commands, the addressed disk controller 24 delivers control signals to the attached disk drive 14 to accomplish the read and write operations which are commanded by the array controllers 16. In response to a read command from the disk controller 24, the attached disk drive 14 reads data previously written at an identified location on a rotating disk (50, FIG. 2) of the disk drive, and this data is supplied by the disk controller 24 on the array bus 22 to the array controllers 16. The array controller 16 normally supplies the data to the host bus 18 where is it received by the host computer 12, although data may be cached in a RAID parity assist (RPA) memory 32 which may optionally be a part of each array controller 16. In response to a write command from the disk controller 24, the attached disk drive 14 writes the data supplied on the array bus 22 to specific addressed locations on the disk drive 14. The data written during a write operation has usually been previously supplied by the host computer 12 to the array controllers 16, or obtained from the RPA memory 32.

Each array controller 16 includes an internal bus 28 which is connected to an array processor 30 and to the RPA memory 32. Although not specifically shown, the RPA memory 32 typically includes as part of its hardware, a conventional cyclical redundancy code (CRC) and parity calculation engine which calculates CRC, parity and other useful metadata information, and stores that calculated CRC and metadata information along with the data written to the RPA memory 32. The calculation engine of the RPA memory 32 eliminates or reduces the need for the array processor 30 or the host computer 12 to calculate CRC and parity metadata when data is recorded in the RPA memory 32.

The array processor 30 is connected to another memory 34 which includes the programming instructions for the processor 30 to execute and thereby achieve the various functional operations of an array controller. The memory 34 comprises a plurality of volatile and non-volatile registers. One non-volatile register 36 stores information which defines a unique controller identification (ID). The controller ID uniquely identifies each array controller 16 and distinguishes it from the other array controllers within the RAID mass storage system 10. In other words, no two array controllers within the mass storage system can have the same controller ID.

Other non-volatile registers 38 also store a plurality of controller sequence numbers. A new and different controller sequence number 38 is assigned by each array controller 16 to identify each full stripe write operation performed by that array controller. A full stripe write operation is described in more detail below in conjunction with FIG. 3. The array controller 16 increments the controller sequence number each time that another full stripe write operation is performed. Thus, each full stripe write operation performed by each array controller 16 is uniquely identified by its own controller sequence number, assigned by the array controller that commanded the full stripe write operation. However, the controller sequence numbers in the storage system 10 are likely not to be unique, because each array controller typically assigns its own controller sequence numbers without regard to the controller sequence numbers assigned by the other array controllers. Thus, the controller sequence number assigned by one array controller may be the same as the controller sequence number assigned by another array controller. The size of the controller sequence numbers and the registers 38 which contain them are preferably so large that the value of the controller sequence number will not wrap as a result of the number of normally-expected full stripe write operations performed during the normal usable lifetime of the RAID storage system 10.

Even though the controller sequence number is not unique within the mass storage system 10, a unique number which identifies every specific full stripe write operation performed by the mass storage system 10 can be derived by the concatenation of the controller ID and the controller sequence number. Since the controller ID is unique within the system 10, each full stripe write is uniquely identified by this concatenation. The present invention makes use of the concatenation of the controller ID and the controller sequence number, in the manner described in detail below. This concatenation of the controller ID and the controller sequence number, as applicable to the present invention, is hereinafter referred to as simply the "sequence number." More details concerning the use of the sequence numbers are described below.

One of the functional aspects of the array controller 16 is to correlate I/O commands from the host computer 12 with the disk drives 14 where the data is to be read or written in the RAID system 10. Typically this correlation function is achieved by use of a mapping table which associates the I/O commands from the host computer 12 to the redundancy groups, the disk drives and the locations on the disks of the disk drives where the data is to be written or read. This mapping algorithm is particularly useful if the RAID system is emulating another type of mass storage system. The mapping algorithm may be dynamic in the sense that it is continually updated to describe where data is written or read. Alternatively, the mapping algorithm may be static to describe the location of the host data and user data parity information.

The correlation function of the mapping algorithm is established by using volumes and logical block address (LBA) for the data which is written and read. A volume is simply a sub-division of the overall total amount of the storage media available for use on the system 10. Volumes are arbitrarily defined by the users to accomplish various user-specific purposes. An LBA is a logical address location within each volume which is established between the host computer 12 and the array controllers 16. The LBAs become the correlation in a mapping table between the addresses or physical locations on the various physical disk drives 14 in the redundancy groups 20 where the components of the data are to be physically stored and retrieved, and the address of the read or write command communicated by the host computer 12. Both volumes and LBAs are conventional in mass storage systems.

Another one of the functional aspects of each array controller 16 is to check the RPA memory 32 to attempt to fulfill requested I/O read/write operations from the host computer 12. If the information sought to be read is within the RPA memory 32, a read operation is directed to the RPA memory 32 and not to the disk drives 14 of the redundancy groups 20. Information to fulfill I/O operations may frequently be found in the RPA memory 32 because it is used to hold cache information when processing I/O requests for that same information from the host computer 12.

Each array controller 16 further implements a conventional write algorithm for ordering and delivering data and write commands to the redundancy groups 20 and to the disk drives 14 within each redundancy group. A variety of different types of write algorithms may be employed for this purpose. In general, the write algorithm involves writing data in one or more blocks on the disk drives 14. Multiple data blocks are typically written in a full stripe write operation. A queue of read/write commands is developed to write the blocks of data. The read/write commands of the queue are executed in sequence and delivered to the disk drives in accordance with the write algorithm. Each disk controller 24 responds to the write commands from the array controller 16 to cause its attached disk drive 14 to write the block of data addressed to it. In addition to writing the data as memory blocks on the disk drives 14 of each redundancy group 20, a similar procedure is used in writing data as blocks in the RPA memory 32.

The present invention attaches or prepends certain additional information and metadata to the raw data when the data is written. The additional information includes the volume identification, the logical block address (LBA), the sequence number (the concatenation of the controller ID and the controller sequence number), a revision number (described in greater detail below), and the parity information for the raw data which has been calculated by the parity calculation engine associated with the RPA memory 32. This metadata is used in an efficient manner without significantly degrading the performance of the mass storage system to detect and correct silent errors and corruptions of data and parity information, as is described more completely below.

Figure 2:
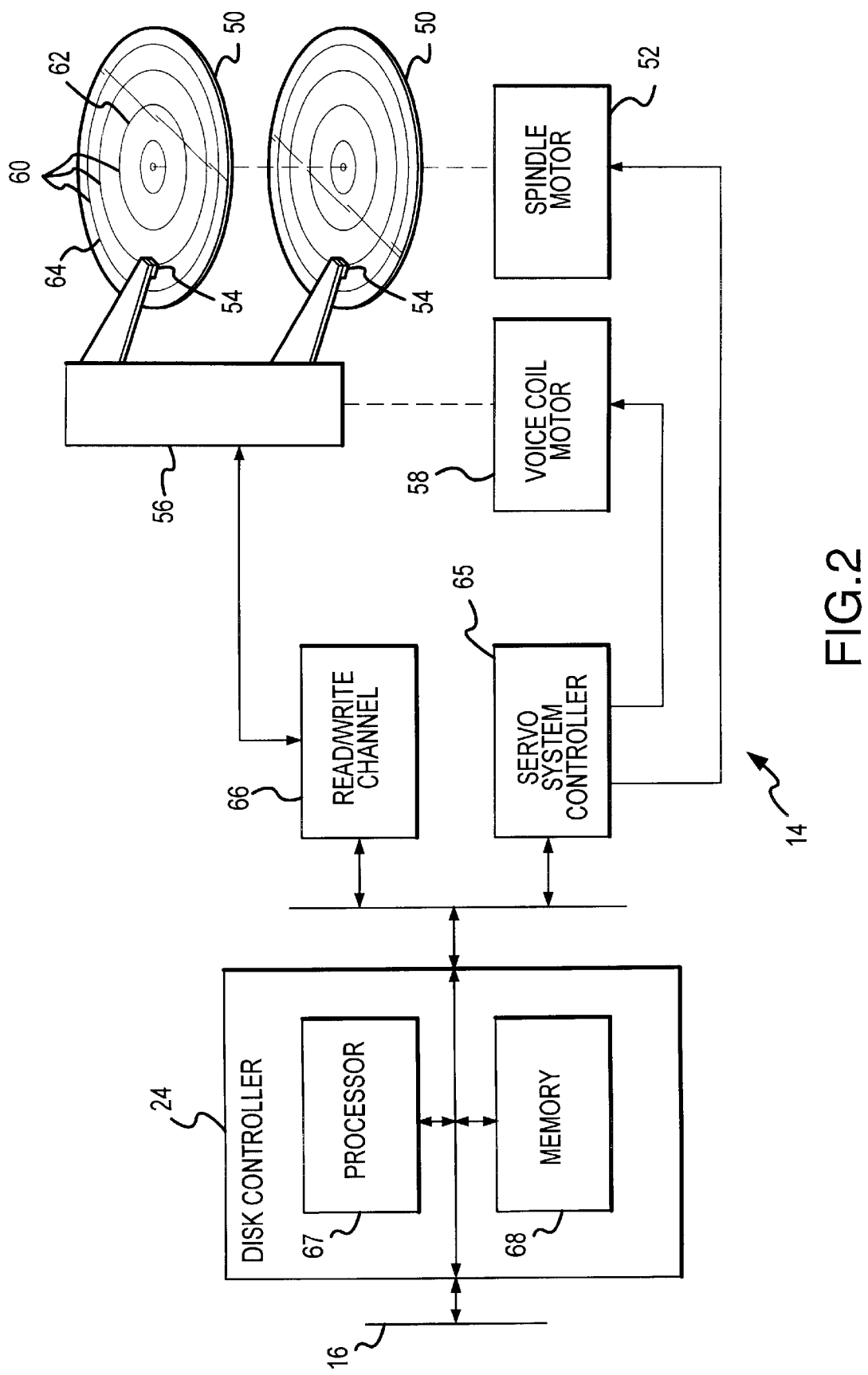
FIG. 2 is a generalized illustration and block diagram of an exemplary single redundancy group of the RAID system shown in FIG. 1.

Basic details concerning a disk drive 14 of each redundancy group 20 are conventional and shown in FIG. 2. Each disk drive 14 includes one or more magnetic disks 50 or platters which are rotated at an essentially constant rate by a spindle motor 52. Data is written to or read from the magnetic disks 50 by a transducer or read/write head 54. The head 54 is connected to an actuator 56 which is moved by a voice coil motor 58 to position the head 54 above different tracks on the rotating disks 50.

The data is written on the disks 50 by magnetic orientations induced into the magnetic surface of the disks 50 from electrical signals applied to the heads 54. The magnetic orientations are recorded in concentric curvi-linear tracks 60 described by the rotation of the disks when the heads are located in a stationary location. These concentric tracks 60 extend from a track 62 at an inner diameter of the magnetic recording surface of the disk 50 to an outer diameter track 64. Typically, there are a large number of tracks 60 recorded on each disk 50, for example 2,000. Each track has its own track number, usually starting with the inner diameter track 62 and extending to the outer diameter track 64.

Each track 60 is also formatted in a predetermined manner to define at least one and preferably a plurality of fixed length sectors for recording data. The typical length of the sector is 512 bytes of data. Of course each sector also includes space to record other information necessary to identify the particular sector number and the like. Each sector is organized to accept 512 bytes of data because the data is typically communicated between the host computer 12 (FIG. 1) and the RAID mass storage system 10 in 512 byte blocks. Each 512 byte block of data is considered one-half of a kilobyte (KB) of data, in a standard computer memory sense.

Each disk drive 14 also includes a servo system controller 65. The servo system controller 65 supplies control signals to the voice coil motor 58 and the spindle motor 52. The control signals to the voice coil motor 58 move the actuator 56 to position the heads 54 at a predetermined track for reading preexisting data from the track or for writing data to the selected track. The control signals supplied to the spindle motor 52 maintain a desired rotational rate of the disks 60.

Each disk drive 14 also includes a read/write channel 66. The read/write channel 66 accomplishes a write operation by applying signals from the disk controller 24 to the head 54. The signals applied to the head 54 induce the magnetic orientations into the magnetic surfaces of the disks 50 in the tracks 60 to record the data. In a read operation, the read/write channel 66 is adapted to receive the signals induced in the heads 54 by the magnetic orientations in the tracks 60. The disk controller 24 receives the signals, conditions them and applies them to the array bus 22. In order to accomplish successful read/write operations, the position of the head 54 is coordinated while adapting the read/write channel 66 to perform the read operation or the write operation.

Each disk controller 24 includes a micro controller or microprocessor, referred to as a processor 67, to which a memory 68 is attached. The processor 67 and memory 68 implement the typical disk I/O operations described generally herein, by executing programmed instructions contained in the memory 68. Some of the operational capability of the array processor 30 (FIG. 1) may be shared with the processor 67 of the disk controller 24, or some of the operational capability of the disk controller processor 67 may be shared with the array processor 30 (FIG. 1). Furthermore, some of the functional capabilities of the array processor 30 (FIG. 1) and the disk controller processor 67 (FIG. 2) may also be accomplished by host computer 12 or array controller 16 (FIG. 1). Such functional interaction is conventional in RAID mass storage systems.

In RAID mass storage systems, it is typical to separate the collective total information involved in an I/O operation into components, and to record the components separately on a plurality of disk drives, in a conventional operation known as a full stripe write. Four exemplary full stripe write operations 69 are graphically illustrated in FIG. 3. Each full stripe write operation 69 shown in FIG. 3 involves writing components of information to each of five disk drives 14. The components of information involved in the operation may occupy approximately the same track and sector addresses on each of the disk drives. The same track and sector addresses are represented by the vertical dashed aligned lines. It is not a requirement that the components of information occupy the same track and sector addresses on each of the disk drives. Instead, the components of information may be located at different track and sector addresses, in which case the aligned vertical dashed lines represent a logical correlation of the different track and sector addresses on each disk drive 14 to the single full stripe write operation. The correlation is known to the disk controllers 24 and array controllers (FIG. 1). However, a full stripe write operation is performed only by a single array controller on the disk drives of a single redundancy group. Multiple array controllers do not participate in a single full stripe write operation. A full stripe write operation is conventionally understood in the field of mass and RAID storage systems. The collective data and other information or metadata written during a full stripe write operation is referred to herein as a "stripe" or a "full stripe."

Figure 3:
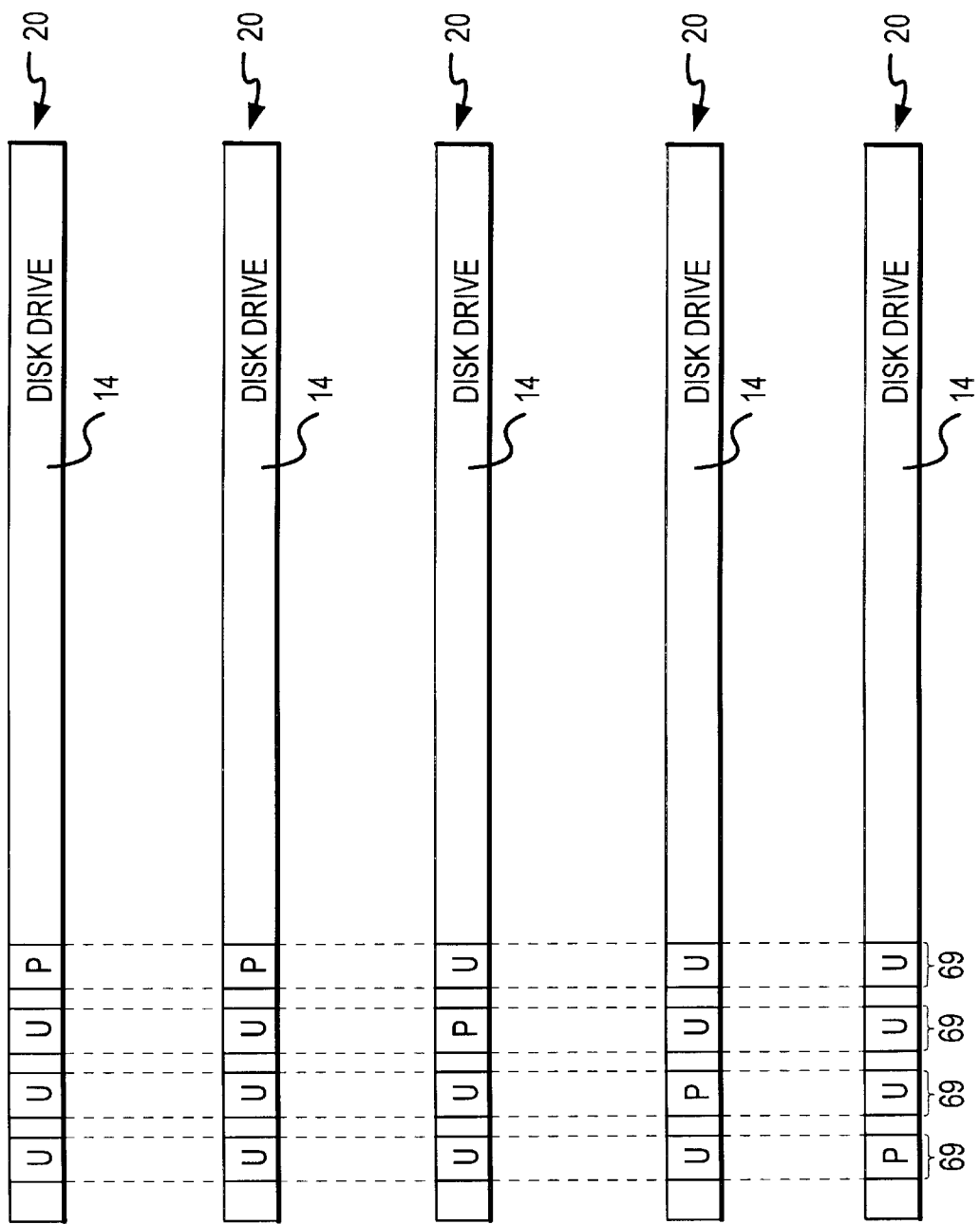
FIG. 3 is an illustration of four full stripe write operations performed on the disk drives of the RAID system shown in FIG. 1.

In accordance with the present invention, each component of information recorded on a separate disk drive is illustrated by the alphabetical letter U or P, to represent a user data structure (U) or a parity data structure (P). A user data structure U and a parity data structure P are described below in greater detail in connection with FIGS. 4 and 5, respectively. As shown in FIG. 3, four user data structures U and one parity data structure P constitute a stripe 69 written during each full stripe write operation 69. Thus, in the example shown in FIG. 3, four user data structures U and one parity data structure P constitute individual components of the total or collective information associated with each stripe 69.

The manner in which the total information is broken up into the components and distributed among the disk drives of one redundancy group in a stripe 69 is established by the mapping algorithm used by the array controllers. Logical block addresses (LBAs) are established by the host computer 12 (FIG. 1) or the array processor 30 (FIG. 2) for the information distributed over the disk drives 14. As can be seen from the examples shown in FIG. 3, the user data structures U involved in each full stripe 69 are preferably distributed among the various disk drives of the redundancy group, so that one disk drive does not contain all of the parity data structures P associated with the user data structures U for each stripe. Distributing the parity and user data information on different disk drives improves performance, because the probability is increased for the relevant information to be more readily available for use when needed, as is known.

It is also apparent from FIG. 3 that a conventional read modify write (RMW) operation could be performed on some but less than all of the user data structures U of the stripe 69, without changing the other user data structures U of that stripe. Such RMW operations are performed frequently within stripes. In accordance with the present invention, a revision number is assigned by the array processor 30 (FIG. 2) to identify each RMW operation performed on each user data structure U or a portion thereof of the stripe 69. Each revision number associated with each user data structure U must be consistent with the revision number contained in the parity data structure P as applicable to that user data structure. Thus within the user data structures of the stripe, the revision numbers may not be unique. The revision number constitutes an important part of the metadata employed in the present invention.

A RMW operation which is performed on some but not all of the user data structures U of the full stripe will change the value of the revision number for each affected user data structure U and the correlated parity data structure P in the manner described herein, but will not change the value of the sequence number which identifies that stripe. Furthermore, changing the revision number for the affected user data structure(s) will not change the value of the revision number for the non-affected user data structures U of that full stripe. Thus, only those user data structures U which have been changed will be assigned a new revision number. As consequence of this revision number assignment technique, the different user data structures U of the full stripe will typically have different revision numbers after some degree of access to and use of the data of the full stripe. The revision number associated with each user data structure U is recorded as information in the user data structure U (as shown at 94 in FIG. 4) and also in the parity data structure P of the full stripe write operation (as shown at 94 in FIG. 5). The revision number is reset to zero in each of the user data structures U and the parity data structure P as a part of initially performing each complete full stripe write operation.

Figure 4:
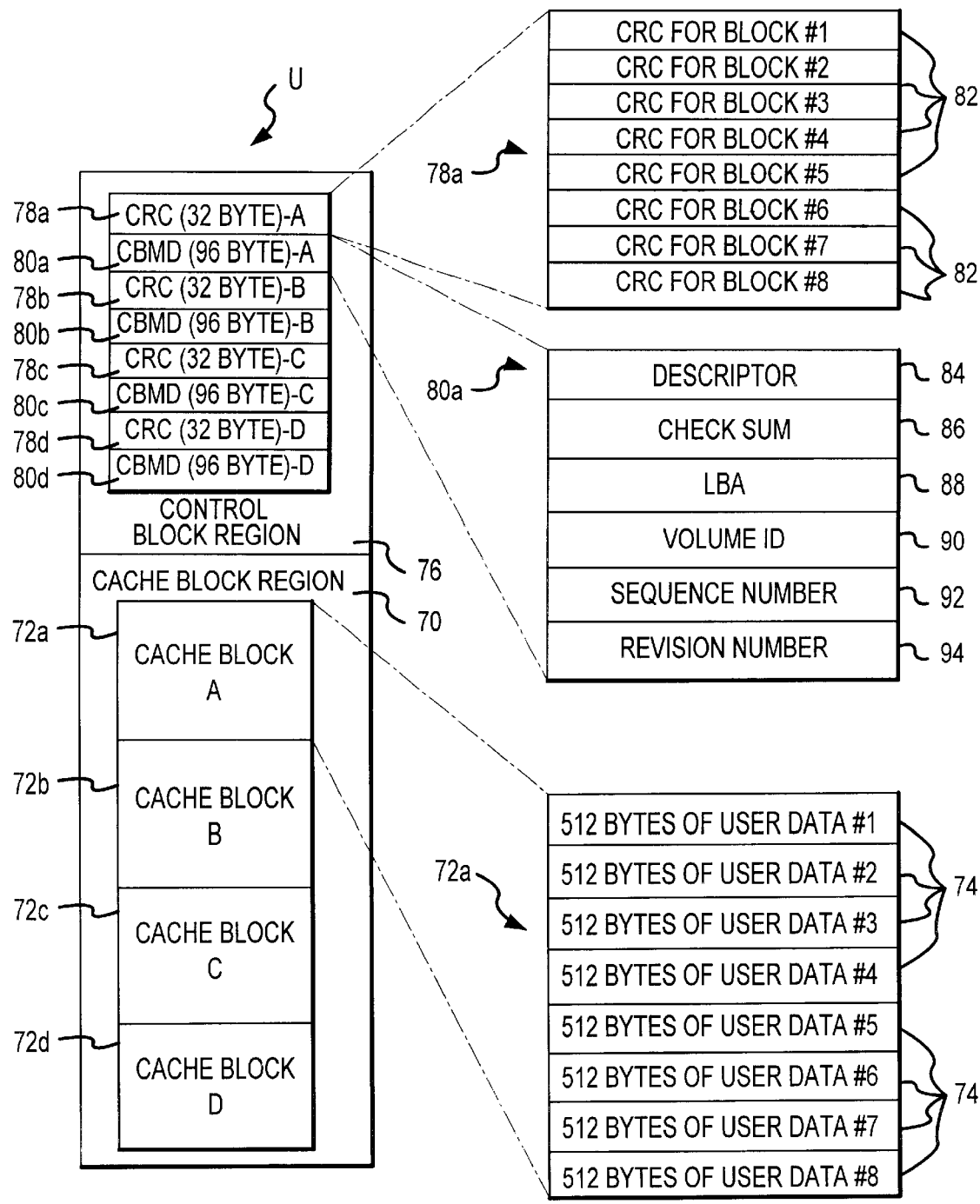
FIG. 4 is an illustration of a user data structure employed in the RAID mass storage system shown in FIG. 1, including a user data cache block region and an associated control block region containing metadata, with explosions of certain fields of those regions.

The physical organization of a user data structures U is shown in detail in FIG. 4. The user data structure U is organized into a cache block region 70 and a control block region 76. The cache block region 70 is a field which contains the user data. The control block region 76 contains the metadata used to provide protection against errors. The cache block region 70 is further divided into four separate user data fields in the form of cache blocks A, B, C and D, numbered 72a, 72b, 72c and 72d, respectively. Each of the four user data cache blocks 72a, 72b, 72c and 72d is preferably 4 kilobytes (KB) in size, although any convenient size could be employed such as 1 KB. User data cache blocks 72a, 72b, 72c and 72d of 4 KB size are each formed by eight 512 byte blocks 74. Each 512 byte block 74 is the same length as a conventional sector of a track 60 of the disk drive 14 (FIG. 2). Arranged in this manner, the user data in each user data cache block 72a, 72b, 72c or 72d will occupy eight 512 byte sectors of the disk drives. Because the four cache blocks 72a–72d form the user data cache block region 70, the entire user data cache block region 70 occupies thirty-two 512 byte sectors of the disk drives. To the extent that the user data does not occupy the entire cache block region 70, entire ones or portions of ones of the cache blocks 72a, 72b, 72c and 72d are not used.

The control block region 76 is associated with each cache block region 70, in each user data structure U. The control block region 76 is further broken down into a plurality of cyclical redundancy code (CRC) data fields 78a, 78b, 78c and 78d, and a plurality of cache block metadata (CBMD) fields 80a, 80b, 80c and 80d. One CRC data and one metadata field is associated with each of the user data cache blocks 72a, 72b, 72c and 72d. Thus, the CRC data field 78a and the cache block metadata field 80a are associated with the user data cache block 72a; the CRC data field 78b and the cache block metadata field 80b are associated with the user data cache block 72b; the CRC data field 78c and the cache block metadata field 80c are associated with the user data cache block 72c; and the CRC data field 78d and the cache block metadata field 80d are associated with the user data cache block 72d.

CRC information is calculated and placed into each of the CRC fields 78a–78d based on the user data located in each of the corresponding user data cache blocks 72a–72d, respectively. The CRC information is calculated in a known manner by a conventional CRC and parity calculation engine associated with the RPA memory (32, FIG. 2), as described above, when the user data is transferred into the user data cache blocks 72a–72d. If a separate CRC and parity calculation engine is not used, the CRC and parity information is calculated separately by a processor.

Each CRC field in the control block region 76 is organized into a plurality of CRC fields 82. One CRC field 82 exists for each one of the 512 byte blocks 74 of user data in the user data cache block with which the CRC field is associated. For example, the CRC field 78a includes eight segment CRC fields 82. The user data cache block 72a is formed by eight separate 512 byte blocks 72 of user data. One segment CRC field 82 corresponds to each of the 512 byte blocks 74. Thus, the information in the first segment CRC field (#1) 82 is the calculated CRC for the first (#1) 512 byte block 74 of user data in the user data cache block 72a, as shown in FIG. 4. A similar situation exists with respect to the CRC information in each of the other segment CRC fields 82 for each of their associated 512 byte blocks 72.

One metadata field 80a–80d of the control block region 76 is also associated with each user data cache block 72a–72d of the cache block region 70. Thus, the metadata field 80a is associated with the cache block 72a; the metadata field 80b is associated with the cache block 72b; the metadata field 80c is associated with the cache block 72c; and the metadata field 80d is associated with the cache block 72d. Each metadata field includes a descriptor field 84, a checksum field 86, a logical block address (LBA) field 88, a volume identification (ID) field 90, a sequence number field 92 and a revision number field 94. The information recorded in the descriptor field 84 is a unique identification which may be used to identify the structure version number or other things. The checksum field 86 contains checksum information which has been calculated across the CBMD field 80a. The checksum information in the checksum field 86 is used conventionally to allow detection of the corrupted data in the metadata field 80a. The information recorded in the LBA field 88 is established by the host computer 12 (FIG. 1) or the array controller 16 (FIG. 2) when mapping the user data into the volume of the RAID mass storage system 10 (FIG. 1). The information in the LBA field 88 is supplied by the host computer or the array controller. The information contained in the volume ID field 90 is an internal unique identifier of a selected segment of the overall storage capacity of the mass storage system.

The information contained in the sequence number field 92 is the sequence number assigned by the array controller 16 (FIG. 1) when a full stripe write operation is performed. As noted above, the sequence number in the field 92 is a concatenation of the unique array controller ID and the array controller sequence number, obtained from registers 36 and 38 (FIG. 1). The concatenation of the array controller ID and the array controller sequence number establishes a sequence number in the sequence number field 92 which is unique within the mass storage system 10 (FIG. 1). As noted previously, the array controller increments the array controller sequence number in the sequence register (38, FIG. 1) with each full stripe write operation performed.

The information contained in the revision number field 94 is generated each time a read modify write (RMW) operation is performed on a user data structure U (FIGS. 3 and 4). The revision number information associated with that user data structure is changed each time a RMW operation is performed on the user data of the associated cache blocks 72a, 72b, 72c and 72d. The revision number generated in this manner is recorded in the revision number field 94. When a full stripe write is initially performed, the revision numbers of all of the revision number fields is set to zero. Thus, after a full stripe write is initially completed, all of the revision numbers associated with all of the cache blocks of all of the user data structures U (and of the parity data structure P described below) will be set to zero, to indicate that the full stripe write operation has been initially completed and that no RMW operations have been performed on any of the newly written data of the full stripe.

The information contained in the revision number field 94 reflects whether any RMW operations have been performed on the user data in the cache block 72a–72d of the associated cache block region 70. Null information in the revision number field 94 indicates that the associated user cache block 72a–72d has not been modified since it was written in the previous full stripe. Information other than null information in the revision number field 94 indicates that a RMW operation has been performed on the information of the the user data cache block 72a–72d. For example, if a RMW operation has been performed on the user data in the cache block 72a, the revision number information in the field 94 will not be zero but will be some finite value which has been incremented from zero. The array controller 16 (FIG. 1) increments the revision number information with each RMW operation. The revision number information in the revision number field 94 will reflect the most recently occurring RMW operation, since the revision number information is changed with each subsequently occurring RMW operation.

The number of bits allocated to each revision number field 94 is relatively small, for example four to eight bits. Otherwise, a substantial amount of memory space in the parity data structure P (described below) would be consumed by the revision numbers. The fact that the size of the revision number field is relatively small means that the present invention must accommodate and recognize circumstances where the revision number wraps upon an overflow of the value of the revision number beyond that which can be accommodated by the available size of the revision number field. Potentially a large number of revision numbers will be assigned to the RMW operations performed on the user data structures U before information is entirely rewritten in an entirely new full stripe write operation.

When a RMW operation is performed, all of the user data information contained in one cache block 72a–72d will be read, modified and written. In other words, the RMW operation will not be performed on only one of the 512 byte blocks 74, but will be performed on all eight of the 512 byte blocks 74 as a unit.

Figure 5:
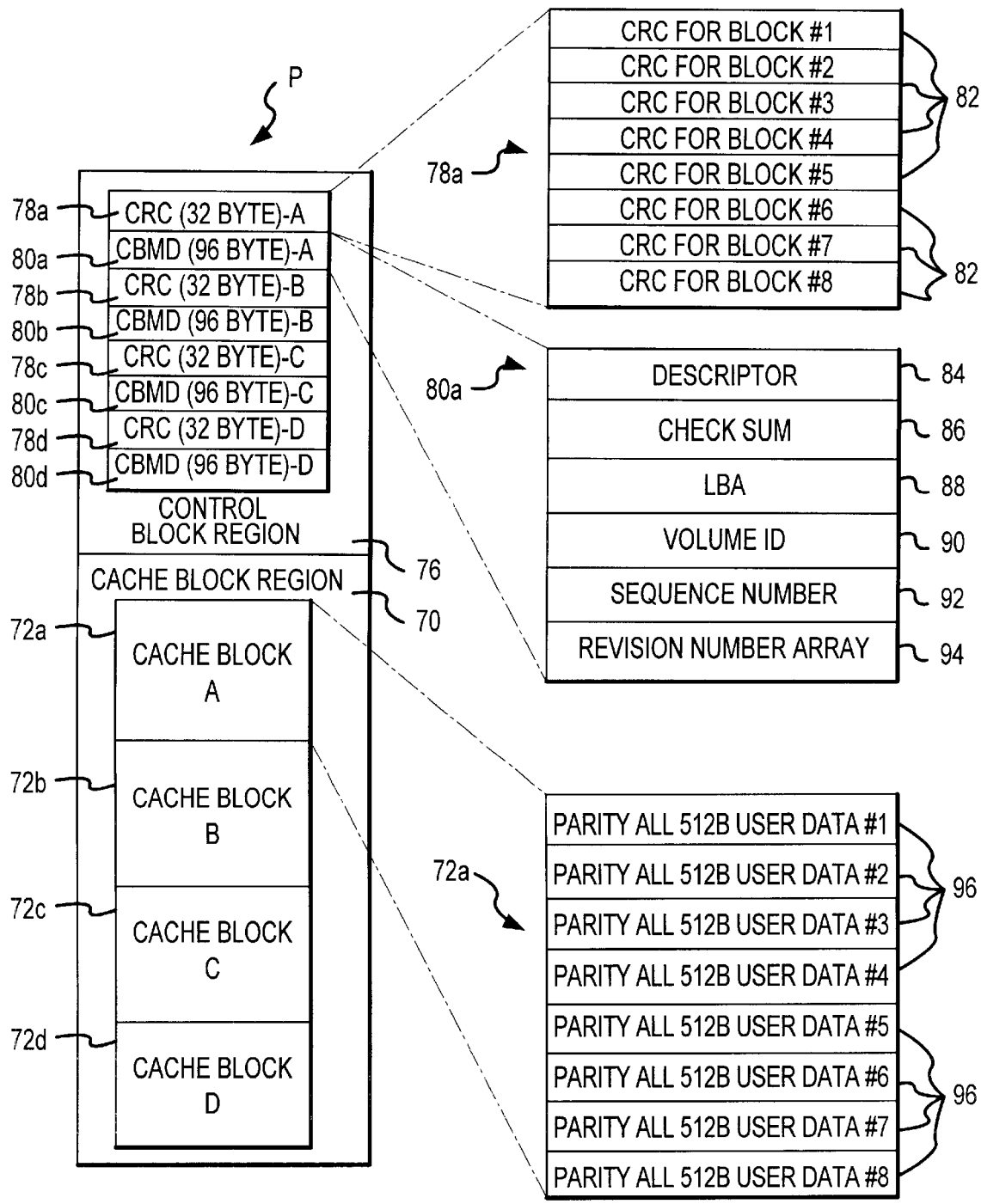
FIG. 5 is an illustration of a parity data structure employed in the RAID mass storage system shown in FIG. 1, including a parity cache block region and an associated control block region containing metadata, with explosions of certain fields of those regions.

Details of the organization of the parity data structure P are shown in FIG. 5. The parity data structure P has essentially the same structural organization as the user data structure U shown in FIG. 4, except that the fields 94 of the cache block metadata fields 80a, 80b, 80c and 80d accommodate an array of revision numbers (a revision number for each associated user data structure U of the stripe) rather than a single revision number as is the case with the user data structures U (FIG. 4). The information contained in the cache block region 70 of the parity data structure P is parity information rather than the user data contained in the cache block region 70 of the user data structures. The information contained in the control block region 76 is CRC and metadata information which describes the parity information contained in the parity data structure P and in the user data structures U of the associated full stripe.

One cyclical redundancy code (CRC) data field and one cache block metadata (CBMD) field is associated with each of the corresponding parity cache blocks 72a, 72b, 72c and 72d of the parity data structure P. Thus, the CRC field 78a and the metadata field 80a are associated with the parity cache block 72a; the CRC field 78b and the metadata field 80b are associated with the parity cache block 72b; the CRC field 78c and the metadata field 80c are associated with the parity cache block 72c; and the CRC field 78d and the metadata field 80d are associated with the parity cache block 72d. CRC information is calculated and placed into each of the CRC fields 78a–78d based on the parity information in the parity cache blocks 72a–72d, respectively. The CRC information is calculated in a known manner by conventional CRC and parity calculation engines when the parity information is transferred into the parity cache blocks 72a–72d.

Each CRC field in the control block region 76 is organized into a plurality of segment CRC fields 82. One segment CRC field exists for each one of the corresponding parity blocks 96 of parity information in the parity cache block 72a–72d with which the CRC field is associated. For example and as is illustrated in FIG. 5, the CRC field 78a includes eight CRC fields 82. The parity cache block 72a is formed by eight separate corresponding parity blocks 96. A different CRC field 82 corresponds to each of the different parity blocks 96. The information in the first segment CRC field (#1) 82 is the calculated CRC for the corresponding first (#1) parity block 96 of parity information in the parity cache block 72a. A similar situation exists with respect to the CRC information in each of the other segment CRC fields 82 for each of their associated corresponding parity blocks 96.

One metadata field 80a–80d of the control block region 76 is also associated with each parity cache block 72a–72d of the cache block region 70. Thus, the metadata field 80a is associated with the parity cache block 72a; the metadata field 80b is associated with the parity cache block 72b; the metadata field 80c is associated with the parity cache block 72c; and the metadata field 80d is associated with the parity cache block 72d. Each metadata field of the parity data structure P includes a descriptor field 84, a checksum field 86, a logical block address (LBA) field 88, a volume identification (ID) field 90, a sequence number field 92 and a field 94 for containing an array of revision numbers from all of the user data structures of the full stripe 69 (FIGS. 3 and 6). The fields 84, 90 and 92 contain a copy of the same information as is present in the corresponding metadata fields of the user data structures U (FIG. 4). The checksum field 86 contains checksum information for the information contained within the metadata field 80a. The LBA field 88 may contain information which describes the entire full stripe. The revision number field 94 contains the revision number of each of the corresponding cache blocks 72a, 72b, 72c and 72d. Whenever a full stripe write operation is performed, the sequence number is recorded in the metadata field 92 of each user data structure U and the parity data structure P. Each time a RMW operation is performed on the user data contained in one of the user data cache blocks 72a–72d (FIG. 4), the revision number attributed to that RMW operation is written into the metadata field 94 associated with the user data cache block of the user data structure and the metadata field 94 of the parity data structure. Thus, the revision numbers in the array field 94 of the parity data structure P for each of these corresponding cache blocks 72a, 72b, 72c and 72d should correspond to the revision number field 94 in each of the user data structures U, if no error has occurred. In essence, each parity data structure P describes parity information for the entire full stripe write operation, in much the same way that the user data is described in the user data structures U.

The relationship of the parity, CRC and metadata information contained in the parity data structure P to the user data, CRC and metadata information contained in the associated user data structures U of the full stripe is can be understood by reference to FIG. 6. As a shown in FIG. 6, only one parity data structure P is utilized in each full stripe 69 (FIG. 3). One parity cache block A, B, C and D (72a, 72b, 72c and 72d, respectively) of the parity data structure P exists and correlates to the parity protecting the user data cache blocks A, B, C and D (72a, 72b, 72c and 72d, respectively) of the user data structures U involved in the stripe 69. In the example shown in FIG. 6, the four user data cache blocks A of the four user data structures U correlate to and are described by the parity cache block A of the parity data structure P of the full stripe 69. A similar correlation and description exists for the other user data blocks B, C and D of the four user data structures and the parity cache blocks B, C and D, respectively, of the parity data structure P.

The parity data structure P also includes a parity control block region (designated "PCBR" in FIG. 6) which contains CRC information and metadata information describing the CRC and metadata information in the correlated user control block regions (each designated "UCBR" in FIG. 6) of the user data structures U of the full stripe 69. The CRC and metadata information in fields 78a and 80a of the parity user data structure P is derived from and describes the CRC and metadata information contained in the same corresponding fields of the user data structures U of the full stripe 69.

More specifically, the correlation of the user data cache blocks (each designated "U Data Cache Blk" in FIG. 6) A, B, C and D to the parity cache blocks of the parity cache blocks (each designated "P Cache Blk" in FIG. 6) A, B, C and D, and the correlation of the user control block regions (UCBR) A, B, C and D to the parity control block regions (PCBR) A, B, C and D of the full stripe is as follows. The parity for all of the user data located in all of the corresponding user data 512 byte blocks 74 (FIG. 4) of all of the user data structures U of the full stripe write is calculated, and that parity information is recorded in correlated parity blocks 96 shown in FIG. 5. For example, in the five drive full stripe shown in FIG. 6, the parity of the user data in all four corresponding first 512 byte blocks 74 (#1) of the first user data cache block 72a (FIG. 4) of each of the four user data structures U of the full stripe is calculated, and that parity information is written to the correlated first parity block 96 of the correlated parity cache block 72a of the parity structure P shown in FIG. 5. Similarly, the parity of all four corresponding second 512 byte user data blocks 74 (#2) of the first user data cache block 72a of each of the four user data structures U of the full stripe 69 is calculated, and that parity is written to the correlated second parity block 96 of the correlated parity cache block 72a of the parity data structure P. This parity calculation and recording procedure is repeated for all of the remaining corresponding and correlated 512 byte user data blocks 74 and parity blocks 96 of all of the cache blocks of the user data and parity data structures.

This parity calculation and recording procedure is illustrated more specifically in FIG. 6 where each of the 512 byte user data blocks 74 of the four user cache blocks (UCB) A, B, C and D of the four user data structures U is individually identified by a different number from 1 to 136. Cache block A of the first user data structure contains eight 512 byte user data blocks 74, numbered 1–8. Cache block B of the first user data structure contains eight more 512 byte user data blocks 74, numbered 9–16. Cache blocks C and D of the first user data structure each contain 8 512 byte user data blocks 74, numbered 17–24 and 25–32, respectively. The four cache blocks A, B, C and D of the second user data structure contain four groups of eight 512 byte user data blocks 74, numbered 33–40, 41–48, 49–56 and 57–64, respectively. Similarly four cache blocks A, B, C and D of the third user data structure has its four groups of eight 512 byte user data blocks 74 numbered 65–72, 73–80, 81–88 and 89–96, respectively; while the four cache blocks A, B, C and D of the fourth user data structure has its four groups of 8 512 byte user data blocks 74 numbered 97–104, 105–112, 113–120 and 121–128, respectively. Using this numbering arrangement shown in FIG. 6, the parity information contained in the first (#1) parity block 96 of the parity data structure P (FIG. 5) covers the user data blocks 74 numbered 1, 33, 65 and 97 of the user cache block A of the four user data structures U which constitute the full stripe 69. In a similar manner, the parity information contained in the second (#2) parity block 96 of the parity data structure P (FIG. 5) covers the user data blocks 74 numbered 2, 34, 66 and 98 of the first cache blocks A of the four user data structures U of the full stripe 69. A similar situation is carried through with respect to the parity calculations for all the other user data blocks.

The correlation of the information contained in the CRC fields 78a and the cache block metadata fields 80a of the parity data structure U (FIG. 5) to the CRC and metadata information contained in the corresponding fields 78a and 80a of the user data structures of the full stripe is as follows. The CRC for the parity information in the first (#1) parity block 96 (FIG. 5) is calculated and placed into the first CRC block (#1), for the corresponding cache blocks A. Since the parity information contained in the first parity block 96 is the calculated parity for all of the user data located in all of the correlated user data 512 byte blocks 74 (FIG. 4) of all of the user data structures U of the full stripe, the CRC information describes the parity information for the user data blocks 74 numbered 1, 33, 65 and 97. In a similar manner, the CRC information for the other parity data blocks 96 is calculated and placed into the corresponding CRC fields (82, FIG. 5) of the parity control block region A of the parity data structure. A similar situation exists with respect to the CRC information for the other parity control block regions B, C and D of the parity data structure.

The metadata information in fields 80a of the parity data structure P, the descriptor field 84, volume ID field 90 and sequence number field 92 (FIG. 5) all should contain the same information as those corresponding fields of the user data structures of the full stripe 69, if no error has occurred. Using this information to correct any errors is described in more detail below. However in the parity data structure P, the field 94 (FIG. 5) contains all four revision numbers which are specifically associated with each of the four user data structures of the full stripe 69. The revision numbers (designated as "R" in FIG. 6) are arranged in an array. Thus, the revision number (U1) associated with the first user data structure of the full stripe 69, and the revision numbers (U2, U3 and U4) associated with the second, third and fourth user data structures of the full stripe 69, respectively, are recorded in the revision number array field 94 of the parity data structure (FIG. 5). As described above, it is possible to modify an individual user data structure U in a read modify write (RMW), and when such a RMW occurs, the modified user data structure is assigned a new revision number. This revision number is recorded both in the control block region of the user data structure as revision metadata information and in the control block region of the parity data structure as revision metadata information.

As is also shown in FIG. 6, the sequence number is designated as "S" and shown to have the same value (X) for all the blocks A, B, C, D of both the user data and parity data structures of the full stripe 69, thereby indicating the integrity of the full stripe since all of its data is written using the same sequence number. As discussed above, a new sequence number is assigned to each new full stripe write. When the full stripe write operation is performed, the revision numbers of each of the user data structures and the parity data structure involved in that full stripe write are set to a predetermined uniform starting point, such as zero.

As is shown in FIGS. 4 and 5, the organization and structure for both the user data structures U and the parity data structure P are the same, with the modest exception noted. The CRC information contained in the CRC fields 82 occupies four bytes for each 512 byte set of user data in the 512 byte fields 74 of each cache block 72a–72d. Since there are eight CRC fields 82, 32 bytes are occupied by each CRC field 78a, 78b, 78c and 78d. The CRC fields 82 for the parity data structures have the same length. Information in the metadata fields 84, 86, 88, 90, 92 and 94 are arranged to occupy less than 96 bytes, with any unused bytes being reserved for future expansion. As such, the CRC information in the CRC field 78a and the metadata information in the metadata field 80a occupies 128 bytes, and this information is associated with the user data or parity cache block 72a. The CRC and metadata fields associated with the other three user data and parity cache blocks also occupy 128 bytes each. Thus, the metadata in the control block region 76 occupies 512 bytes, which is equal to the information-containing capability of a standard sector of a track 60 (FIG. 2) of the disk drive 14 (FIGS. 1 and 2).

Each 4 KB user data cache block 72a–72d preferably consumes eight fields of 512 bytes each, so the user data cache block region 70 consumes 32 512 byte fields or 32 512 byte sectors of the disk drives. A similar length is allotted for the parity cache blocks 72a–72d. Consequently, to store 32 512 byte blocks of user data (16 KB total) and to accommodate the associated 512 bytes of parity data requires 33 512 byte sectors. Stated alternatively, for the eight 512 byte segments necessary to accommodate each 4 KB user data cache block 72a–72d, an additional one-fourth of one 512 byte segment (i.e. 128 bytes) will be required. Thus, eight and one-fourth 512 byte segments will be required to handle each 4 KB of user data when using the present invention. Viewed from the perspective of a single 512 byte segment, an additional 16 bytes is required to accommodate the metadata of the present invention for each 512 bytes of user data.

Detecting and correcting errors will be enhanced if the metadata is closely logically, and preferably also physically, associated with the user data. A logical relationship allows the metadata and the user data to be accessed with the same read request as the user data. Eliminating additional read requests improves the speed of operation of the mass storage system.

One technique of accommodating 512 byte segments and the additional 16 bytes required for metadata associated with that 512 byte segment, is to reformat the disk drives the into non-standard 528 byte sectors. Reformatting a disk drive into a non-standard sector size raises issues of reliability in the functionality of the drives themselves. Disk drives have been subjected to many hours of operation and many tests in the standard 512 byte segment configuration, and reconfiguring the disk drive into a non-standard sector size may raise the risk of losing the reliability gained from testing in the standard configuration. Timing and error risks may also arise using the non-standard sector size.

The use of a non-standard sector size may also lead to difficulties in servicing disk drives, and to difficulties in carrying spare drives necessary for service during a mechanical failure. Furthermore, if the standard sector size is employed, the use of the invention on one hand, or the option not use the invention on the other hand, are both available, since either using the invention or not using the invention will both employ standard 512 byte sectors.

It is therefore desirable to employ a technique of laying out standard size 512 byte sectors to allow storing the CRC and metadata information of the present invention in close logical adjacency with the user data on the disk drives, thereby allowing the invention to be selectively enabled or not without requiring a change in the standard 512 byte formatting of the disk drives. Logical adjacency results in the metadata of the present invention being supplied with the user or parity data as a result of a single read request. Further still, the memory layout allows the storage array to define volumes with and without metadata protection within the same storage array and even on the same redundancy groups.

Figures 7, 8, 9:
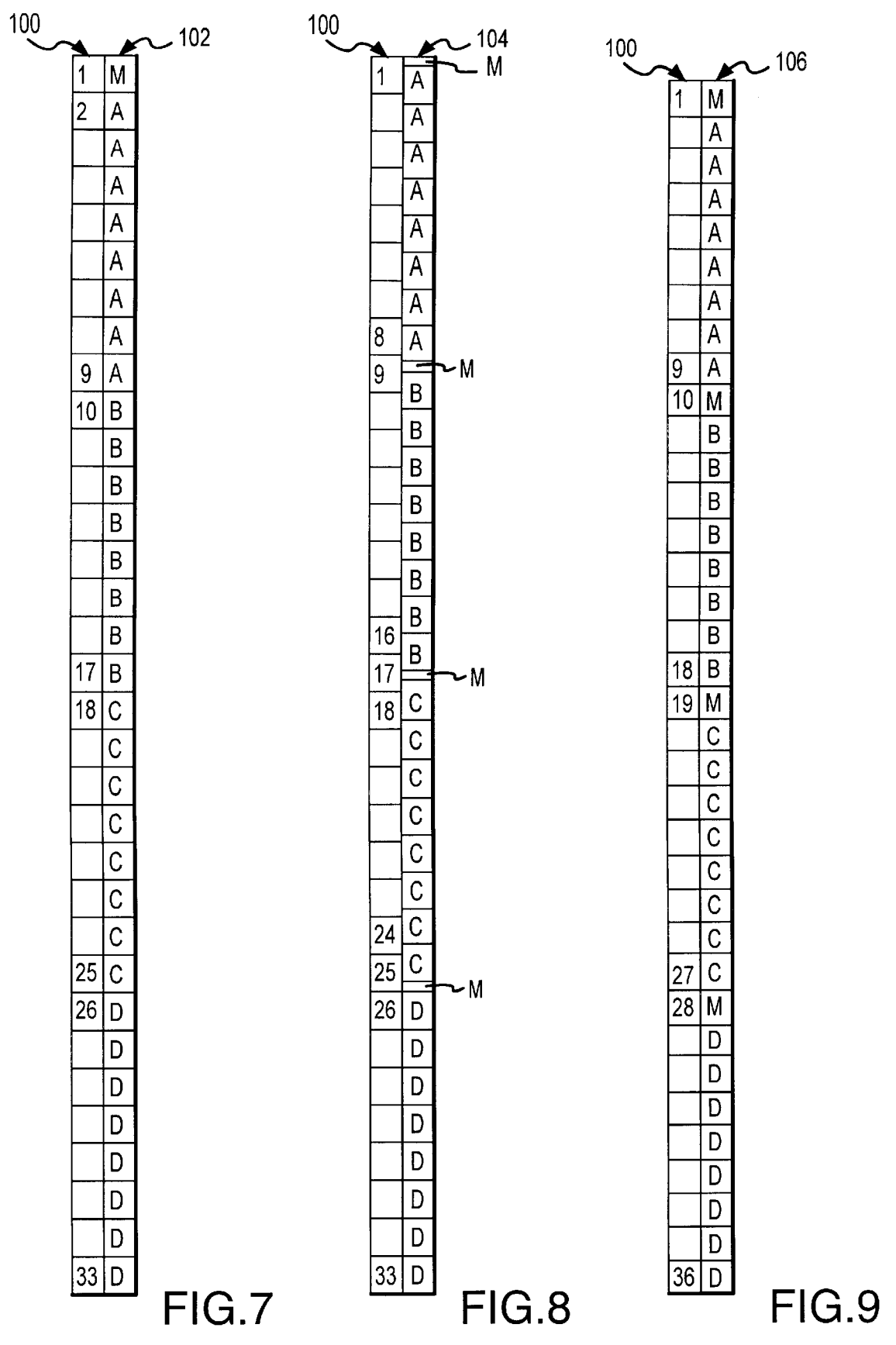

Since each 4 KB block of user data requires 128 bytes to store the metadata, it follows that 16 KB of user data will require one 512 byte sector. 16 KB of user data will require 32 512 byte sectors. Thus, one very efficient way of laying out the user data and the metadata is illustrated in FIG. 7. The left-hand column 100 is an illustration of thirty-three consecutive, standard 512 byte sectors on a disk drive. The right-hand column 102 illustrates the 33 512 byte sectors used to record the user data structure U having four 4 KB user data cache blocks 72a, 72b, 72c and 72d, (FIG. 4) and its associated metadata (M) of its control block region 76 (FIG. 4). The first 512 byte sector occupying position 1 is used to write the metadata (M) of the the control block region 76 of the user data structure U (FIG. 4). The user data cache blocks 72a, 72b, 72c and 72d are designated in FIG. 7 by the alphabetical letters A, B, C and D, respectively, and these user data cache blocks are written in positions 2–33. This data structure layout of media sectors is thereafter replicated for each of the other user data structures U and the parity data structure P. All the media sectors are fully occupied and efficiently used without reformatting the media from the standard 512 byte sectors into non-standard sector sizes.

Another media layout 104 for a data structure U is illustrated in FIG. 8. Again, the left hand column 100 illustrates a sequence of 33 conventional 512 byte sectors in a disk drive storage media. Again, each of the user data cache blocks 72a–72d (represented by the alphabetical letters A, B, C and D) of the user data structure U are each 4 KB in length. The amount of metadata M associated with each 4 KB user data cache block is 128 bytes. The metadata M associated with each user data cache block A, B, C and D is located in physical adjacency with each user data cache block, and therefore the metadata M associated with each user data cache block A, B, C or D requires 128 bytes of storage media in addition to eight media sectors for each of the user data cache blocks A, B, C and D.

As shown in the FIG. 8 media layout, the user data cache blocks A, B, and C are skewed or offset throughout the first 25 of the 33 sectors, with 128 bytes of metadata M preceding each user data cache block. The last eight sectors of the user data cache block D fall coincidentally within sectors 26 to 33. The next user data cache block and its associated metadata is located adjacent to the preceding user data cache block and its associated metadata, so that no portions of the media sectors are unused. The mapping algorithm must account for this overlap to access data in the manner shown in column 104 by recognizing that a given 4 KB cache block of user data must be fetched by accessing nine media sectors. Within the accessed nine media sectors, 4 KB of cache block data will fill the I/O-request, 128 bytes will constitute the metadata associated with the 4 KB of cache block data, and the remaining 384 bytes of data of the ninth media sector are user data or metadata associated with a different 4 KB cache block. When processing a write command, the mapping algorithm must manage the 4 KB cache block write as a nine sector write operation in which the data to be written includes 4 KB of user data and 128 bytes of metadata for the 4 KB of user data, and the remaining 384 bytes is the data and metadata of another 4 KB data block. Thus, using the technique illustrated in FIG. 8 requires somewhat more intensive processing of the mapping algorithm to keep track of the addresses for the cache blocks and their associated metadata.

Another layout 106 of media sectors to accommodate the user data cache blocks A, B, C and D and metadata M is illustrated in FIG. 9. A standard sequential layout of 36 512 byte sectors is shown by the left-hand column 100, while the layout technique is illustrated by the arrangement of 512 byte sectors in the right hand column 106. The data structure memory layout 106 simply uses an additional ninth sector for recording the metadata M in front of each following 8 512 byte sectors occupied by the 4 KB cache blocks A, B, C and D. 384 bytes of each metadata sector M is not used, because the metadata associated with the 4 KB cache block requires only 128 bytes. Arranged in this manner, 36 512 byte sectors are required to accommodate 16 KB of user data in the cache blocks A, B, C, and D. The layout 106 shown in FIG. 9 is inefficient or costly from a media or disk use standpoint, because the capacity of three 512 byte sectors (four 384 byte portions of the four metadata sectors M) is not used for each 32 512 byte sectors (16 KB) of user data which are used. However, the layout 106 avoids the programming and tracking difficulties associated with having to include portions of another 4 KB cache block as part of an I/O command.

Figure 10:
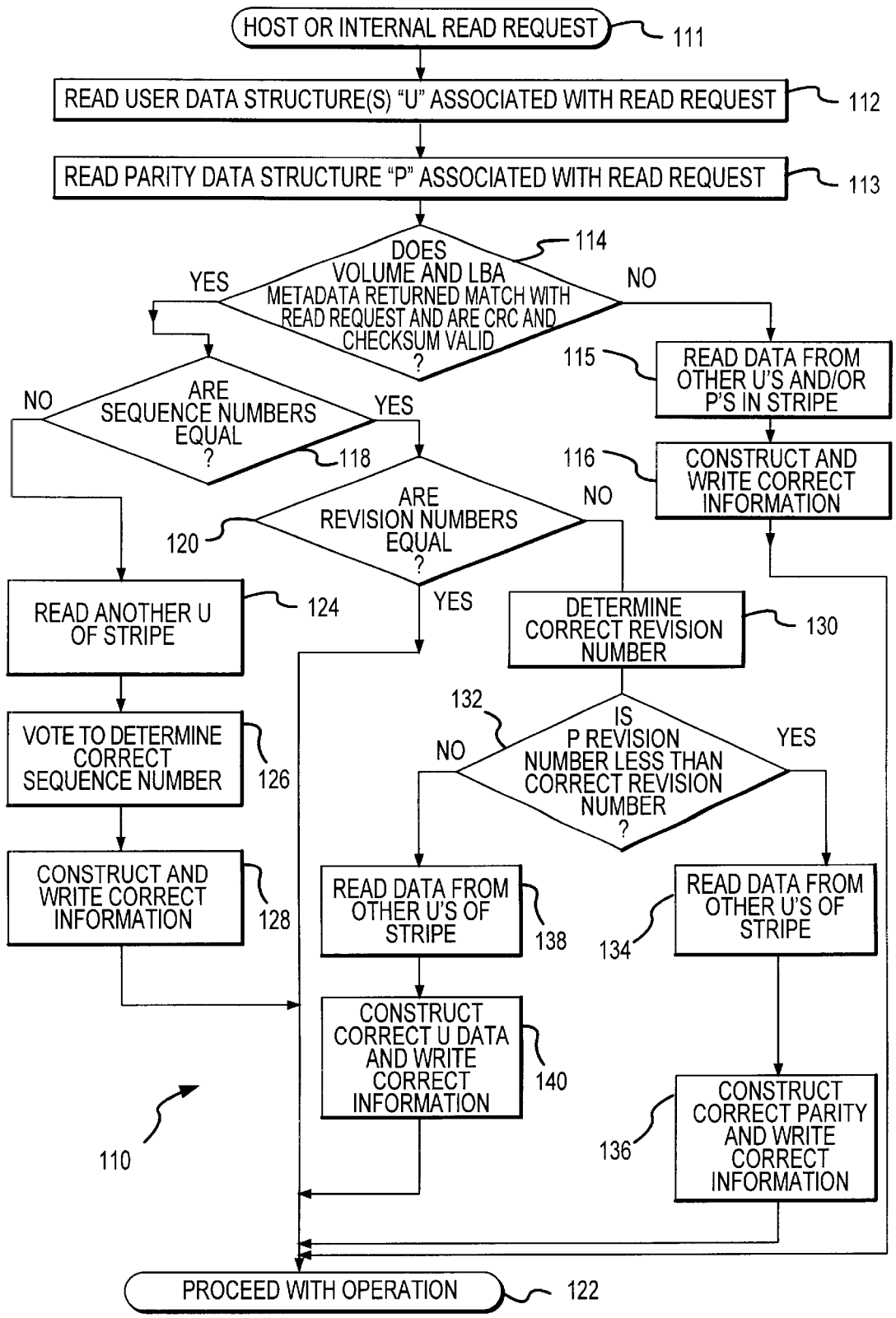
FIG. 10 is a flowchart of the operations performed in accordance with the present invention to use sequence number and revision number metadata from the control block regions of the user data and parity data structures shown in FIGS. 4 and 5, to detect and correct errors.

The use of the sequence number and revision number metadata to detect and correct errors is accomplished by algorithm 110 which is illustrated by the flowchart shown in FIG. 10. The algorithm 110 begins at 111 with a read request from the host computer (12, FIG. 1) or an internal read request from the array controller (16, FIG. 1). Next, the information from the user data structures U associated with the read request 111 is read at step 112. Thereafter, the information from the parity data structure P is read at step 113. Although the steps 112 and 113 are shown in FIG. 10 as occurring sequentially, the steps will typically be accomplished simultaneously, as a part of a single read request. The memory layouts shown in FIGS. 7–9 facilitate single read requests. The parity data structure P read at step 113 is that parity data structure which is associated with all of the user data structures U read at step 111.

After having read the user data structure(s) U and the associated parity data structure P at steps 112 and 113, respectively, a determination is made at step 114 as to whether the volume and LBA metadata returned from the storage media matches with the volume and LBA information contained in the read request generated by the host computer or the array controller at step 111. If the volume and LBA metadata returned by the disk drive storage media do not agree with that of the read request, an error has occurred. It will therefore be necessary to reconstruct those user data structures or the parity data structure which contains the incorrect volume and LBA information. To reconstruct this information, the data from the other user data structures (U) and the parity data structure (P) of the full stripe are read at step 115. Having all of the correct information of the full stripe other than the single user data structure or the parity data structure having the incorrect volume and LBA information, allows the correct information for the erroneous user data or parity data structure to be constructed and written at step 116. Constructing the correct parity is accomplished by using data contained in the user data structures if the parity data structure contains the error in volume and LBA information, or by using all of the user data structures having the correct volume and LBA information along with the correct parity data structure to construct the correct information for the single erroneous user data structure. Once the correct information has been constructed and written at step 116 the operation proceeds at step 122. Proceeding with the operation at step 122 under the circumstances involves starting over with the read request at step 111, which will allow it to be accomplished with respect to the correct volume and LBA information.

A part of the determination at step 114 involves determining whether the CRC and checksum are valid. When the data is read at step 112, part of the read operation involves a calculation of the CRC and checksum information relative to that data which is read from the disk drive storage media. The CRC calculation is performed as an inherent part of the read operation itself, preferably by the CRC calculation engine which is part of the RPA memory 32 (FIG. 1) as has been described above. The checksum calculation may be performed in similar manner or by use of checksum calculation software operating as a part of the array controller 16 (FIG. 1). Alternatively, the checksum calculation may be performed by the processor 67. In any event, the read operation itself inherently generates CRC and checksum information from the data obtained from the read operation, and this inherently generated information is compared to that information present at 82 and 86 in the user data structures U and the parity data structure P (FIGS. 4 and 5). If there is a discrepancy between the CRC and checksum information calculated from the read operation and that similar information contained in the user and parity data structures, as determined at step 114, the program flow proceeds to step 115 where the functions described at steps 115, 116 and 122 are thereafter performed.

On the other hand, if the determination at step 114 is that the metadata has been returned from the disk drives and matches with that of the read request, and the CRC and checksum information calculated from the data obtained from the read operation is the same is that contained in the user and parity data structures, the flow continues to step 118 where a determination is made of whether the sequence numbers of each user data structure U and the parity data structure P match. If so, all of the data and information in the user data structures and the parity data structure which were read at steps 112 and 113 have been properly associated with a single, integral full stripe, meaning that no data corruption was detected in the full stripe has been corrupted by due to some erroneous action of the mass storage system.

Thereafter, during a read operation which is addressed to only one of the user data structures U which was read at steps 112 and 113, a determination is made at step 120 of whether the revision number of the addressed user data structure U is equal to the revision number of the parity data structure P. A memory read operation inherently reads the user data in one of the cache blocks (72a–72d, FIG. 4) as well as the associated CRC and metadata in the control block region 76 (FIG. 4), including the revision number field (74, FIG. 4). Also, the correlated revision number field (74, FIG. 5) of the corresponding parity data structure P is read. If the values from the revision number fields of the user data structure U and the parity data structure P are the same, as determined at step 120, there is an indication of correctness, and the required memory operation can proceed as indicated at step 122.

Thus, by using the metadata of the sequence number and the revision number, and comparing the sequence and revision numbers of the user data structure U with the sequence and revision numbers of the corresponding parity data structure P, at steps 118 and 120, respectively, it can be determined as a consequence of the read operation itself whether or not an error, data path corruption or drive corruption has occurred. If no such detectable error has occurred, as determined by "yes" determinations at steps 118 and 120, the requested I/O operation proceeds at step 122. However, if a detectable error has occurred as indicated by one of the "no" determinations at steps 118 and 120, the information contained in the user data structures (U, FIG. 4) and the parity data structure (P, FIG. 5) provide sufficient information so that the correct data can be created or constructed, thereby correcting the user data and parity data structures before the memory operation proceeds at step 122.

Because of the importance of the revision number and sequence number of metadata in the present invention, it may be advantageous to maintain a separate metadata region for the revision numbers and sequence numbers in cache memory of the array controller 16 (FIG. 1). For example, a portion of the RPA memory 32 may be partitioned and used exclusively for holding the revision number and sequence number of metadata associated with each of the cache blocks of all the parity data structures P. By maintaining the revision number and sequence number metadata in such a cache memory, the time and activity associated with a separate read request of the parity data structure as shown at step 113 could be eliminated, thereby further enhancing the performance achieved by the present invention. Obtaining the revision number and sequence number of metadata from cache memory occurs much more rapidly than obtaining the same information from a separate I/O operation directed to the parity data structure. Moreover, the amount of space consumed by the revision number and sequence number of metadata in cache memory partition is relatively small compared to the additional cost for the additional cache memory space, even for a large number of stripes. Thus, referring to sequence number and revision number metadata from cache memory to make the determinations at steps 118 and 120 will usually eliminate the necessity to perform the separate step 113. Instead, step 113 need only be performed as necessary to correct errors in data.

A "no" determination made at step 118 indicates that the user data structure U and parity data structure P of the read operation do not have the same sequence number. A "no" determination at 118 indicates the full stripe write operation was not properly performed initially, or that subsequent memory operations have corrupted the information that was correctly written initially in the full stripe. An example of a full stripe write operation which was not properly performed in the initial instance is where some of the user data structures U were not written to the proper address or the parity data structure P was not written to the proper address associated with the full stripe write operation. In those cases, the information located at the correct address is unrelated to that of the intended full stripe write operation, and will therefore indicate an error condition. An example of a full stripe write operation which is subsequently corrupted by an incorrect memory operation is when one of the user data structures U or the parity data structure P is over-written by an incorrectly addressed memory operation associated with some other full stripe write operation or some other read modify write (RMW) operation.

When the sequence numbers of the user data and parity data structures have been determined to be different at step 118, it is necessary to determine the correct sequence number in order to correct the information which is inaccurate or erroneous, before proceeding with the requested memory operation at step 122. To determine the correct sequence number, it is necessary to read another user data structure U from the stripe to obtain its sequence number, as shown at step 124. After step 124 has been accomplished, three sequence numbers are available, one from the user data structure U which was addressed in the original read request, one from the parity data structure P which was associated with the user data structure addressed in the original read request, and one from the second user data structure U which was read at step 124. Of these three sequence numbers, it is assumed that the two sequence numbers which agree are the correct sequence numbers, since the chances of two separate errors occurring with respect to the information of a single full stripe before any single one of the errors was corrected, is highly improbable from a statistical standpoint. Therefore in step 126, a vote is taken to determine which two of the three sequence numbers is correct.

After determining the correct sequence number at step 126, the correct sequence number is used to reconstruct and write the correct information to the incorrect user data structure or the incorrect parity data structure. The correct information is constructed and written at step 128. To correct the data and the metadata associated with a user data structure which had the wrong sequence number, all of the metadata from the parity data structure and all of the information from the other user data structures in the full stripe write operation is used. By knowing the parity from the parity user data structure, and all of the other data from the correct user data structures, the data and metadata for the incorrect user data structure may be reconstructed using well-known error correction techniques.

To the extent that the parity data structure P has been corrupted, the correct metadata for the parity data structure can be obtained from the correct data and the correct metadata contained in all of the user data structures U of the full stripe write operation. Obtaining the correct metadata for the parity data structure is performed in the same manner as originally performed when the metadata of the parity data structure is written during a full stripe write operation.

Another method of constructing the correct data in certain types of RAID memory systems is to obtain a complete copy of the correct data from other, mirroring redundancy groups. Some types of RAID memory systems contain a complete redundant duplicate or mirroring copy of the information contained in other redundancy groups. If a duplicate copy of the information exists, the correct information obtained from the duplicate copy is substituted for the incorrect information. The information in the mirrored or redundant copy is determined to be correct by use of the same procedure described at steps 118 and 120. Once the correct information has been constructed and written at step 128, the requested memory operation can proceed as indicated at step 122.

A determination that the revision numbers are not equal at step 120 is an indication that a previous read modify write (RMW) operation was not correctly performed. For example, the disk drive (14, FIG. 1) may not have actually written information to the selected user data structures U, even though it indicated that the write operation was successfully performed. Furthermore, information intended to be written to a user data structure may have been incorrectly written at the wrong address. These types of errors are reflected by the "no" determination at step 120.

To determine the correct revision number and then use it to correct the information, it is first determined at step 130 which of the two revision numbers is correct. The correct revision number is assumed to be the larger or most recent number, taking into account the possibility that the revision number has wrapped as described above. One revision number is available from the user data structure read at step 112 and the other revision number is available from the parity data structure read at step 113. Since the revision number associated with the affected user data cache block (72a–72b, FIG. 4) is changed with each RMW operation, it is assumed that the larger or most recently used revision number will have only been recorded if a RMW operation was intended. Revision numbers are recorded during an RMW operation only during the write part of that operation. Therefore, the existence of different revision numbers is an indication that a previous I/O operation was erred. At step 130, the larger or most recently used revision number is determined to be correct.

After determining the correct revision number at step 130, a determination is made at step 132 of whether the revision number obtained from the parity data structure P is less than, smaller than, or used previously to the correct revision number determined at step 130. If the determination at step 132 is "yes," an error occurred with respect to the revision number in the parity data structure. Under such circumstances, the collective correct user data from the user data structures U of the full stripe is read at step 134 and is used at step 136 to reconstruct the metadata in the parity data structure. Once the correct metadata including the correct revision number information has been recorded in the parity data structure at step 136, the requested memory operation may proceed at step 122.

If the revision number from the parity data structure is equal to the correct revision number, as determined at step 132 (and step 120), this indicates that the revision number associated with the user data structure U is incorrect, and the user data structure must be corrected before the read operation can proceed. To correct the data in the user data structure which is incorrect, all the information from the other user data structures and the parity data structure must be gathered as shown in step 138. Having all of the data except the incorrect data and having the correct parity allows the application of conventional error correction techniques to construct the erroneous data. Constructing the correct data is accomplished at step 140. Once the correct information has been established, the correct information is written to the user data structure which previously had the incorrect information at step 140. Thereafter, once the correct information has been written, the read operation may proceed as shown at step 122.

Although steps 116, 128, 136 and 140 have been shown in FIG. 10 and described in terms of constructing and writing the correct information, these step also involve constructing and writing new information when the previous information is incorrect or missing. Moreover, although the invention has been described in terms of reading and writing information to the disks of redundancy groups, the present invention is also applicable to reading and writing information in cache as part of the overall operation of ultimately reading and writing the information to permanent storage media. In the case of reading and writing cache, the I/O operations associated with reading and writing the disks are avoided, at least on a temporary basis.

In summary, the use of the sequence number and the revision number as metadata is effective to detect errors, including silent data path and drive data corruption errors arising from not writing the information onto the storage media after having acknowledged doing so, returning information in response to a write request obtained from an incorrect memory location, and writing information in response to a write request to the wrong memory location. In addition, the sequence number and revision number metadata are useful in detecting incomplete write operations, situations where the parity and data are inconsistent, and failed I/O operations. Not only can these silent errors and other malfunctions be detected, the sequence number and revision number metadata can be effectively used to correct such errors. The detection and correction of these errors is performed in conjunction with the typical read operations necessary to either return information or to record new information (in an RMW operation), so the computational overhead required to detect such errors is very small, compared to the computational overhead required to continually check all memory operations. The present invention provides a direct, media-space-efficient and direct method of detecting the errors only when a read operation is required, and accomplishing the correction before the write operation is performed. Numerous other improvements, advantages and benefits will be apparent after gaining a complete comprehension of the present invention.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiment set forth above.

The invention claimed is:

1. A method of creating metadata from user data to detect errors arising from input/output (I/O) operations performed on information storage media of a mass storage system, comprising the steps of:

creating a plurality of user data structures, each user data structure containing user data and metadata, the metadata of each user data structure describing the user data contained in that same user data structure;

creating a parity data structure associated with the plurality of user data structures, the parity data structure containing metadata which describes separately the user data and metadata in each of the user data structures with which the parity data structure is associated;

writing the plurality of user data structures and the associated parity data structure to the storage media as an integral group of related data structures in a group-write I/O operation;

including a sequence number as part of the metadata in each user data structure and in the parity data structure of the group, the sequence number identifying the group-write I/O operation;

including a revision number as part of the metadata in each user data structure and in the parity data structure of the group, the revision number identifying a partial-write I/O operation in which the user data in each of less than all of the user data structures of the group is written while the user data in the other remaining user data structures of the group is not written; and including parity information in the parity data structure which describes the parity of the collective user data in all of the user data structures of the group.

2. A method as defined in claim 1 used additionally for detecting errors arising from the I/O operations, further comprising the steps of:

reading the sequence number from each of the user data structures involved in the partial-write I/O operation and from the parity data structure during the partial-write I/O operation; and determining whether the sequence numbers read from the user data structures and from the parity data structure match.

3. A method as defined in claim 2, further comprising the steps of:

reading the sequence number of another user data structure of the group when the sequence numbers read from one user data structure and the parity data structure do not match; and determining a correct sequence number which is equal to two matching ones of the three sequence numbers read from the two user data structures and the parity data structure of the group.

4. A method as defined in claim 3 used additionally for correcting errors arising from I/O operations, further comprising the step of:

using the user data from the user data structure and the parity information from the parity data structure which both have correct sequence numbers to construct correct user data and metadata information for writing in another user data structure of the group which has the incorrect sequence number; and using the user data from the user data structures of the group which have correct sequence numbers to construct correct parity information for the parity data structure which has an incorrect sequence number.

5. A method as defined in claim 4, further comprising the steps of:

writing the constructed correct information to the one of the user data structures or the parity data structure which previously had an incorrect sequence number.

6. A method as defined in claim 5, further comprising the step of:

executing the I/O operation after performing the aforesaid step of writing the constructed correct information.

7. A method as defined in claim 2, further comprising the steps of:

reading the revision number from the user data structures involved in the partial-write I/O operation and from the parity data structure during the partial-write I/O operation when the sequence numbers match; and thereafter determining whether the revision numbers from the user data structures and the parity data structure match.

8. A method as defined in claim 7, further comprising the step of:

executing completely the partial-write I/O operation when the sequence numbers and the revision numbers match.

9. A method as defined in claim 7, further comprising the step of:

determining which of the revision numbers is indicative of a later-occurring partial-write I/O operation when the revision numbers do not match; and thereafter attributing the revision number indicative of the later-occurring partial-write I/O operation as a correct revision number.

10. A method as defined in claim 9, further comprising the steps of:

determining whether the revision number read from the parity data structure occurred before the correct revision number.

11. A method as defined in claim 10 used additionally for correcting errors arising from I/O operations, further comprising the steps of:

reading the user data and parity information from the other user data structures of the group and reading the parity information from the parity data structure, when the revision number read from a user data structure involved in the partial-write I/O operation occurred before the correct revision number; and thereafter constructing the correct user data for the user data structure involved in the partial-write I/O operation from the user data read from the other user data structures of the group and the parity information read from the parity data structure.

12. A method as defined in claim 11, further comprising the step of:

executing the partial-write I/O operation after performing the aforesaid step of writing the correct user data in the user data structure.

13. A method as defined in claim 10 used additionally for correcting errors arising from I/O operations, further comprising the steps of:

reading the user data and metadata from the user data structures of the group when the revision number read from the parity data structure occurred before the correct revision number; and thereafter constructing correct metadata and parity information for the parity data structure from the user data and metadata read from the user data structures of the group.

14. A method as defined in claim 13, further comprising the steps of:

writing the correct metadata including the correct revision number and the correct parity information in the parity data structure.

15. A method as defined in claim 14, further comprising the step of:

executing the partial-write I/O operation after performing the aforesaid step of writing the correct metadata and parity information in the parity data structure.

16. A method as defined in claim 1 wherein the mass storage system comprises a redundant array of independent disks (RAID) mass storage system having at least one redundancy group which includes a plurality of disk drives, and the group-write operation is a full stripe write operation in which a stripe is written to the redundancy group.

17. A method as defined in claim 16 wherein each user data structure and the parity data structure of the stripe are each written on separate disk drives in the redundancy group.

18. A method as defined in claim 17 wherein the partial-write operation is a read modify write operation performed on each of the less than all of the user data structures of the group.

19. A method as defined in claim 17 wherein the RAID mass storage system includes a cache memory apart from the disk drives of each redundancy groups, and said method further comprises the steps of:

recording sequence numbers and revision numbers identical to those within the parity data structure in the cache memory; and referring to the sequence number and revision number in the cache memory during a read I/O operation of the user data structures written on the disk drives.

20. A method of detecting and correcting errors arising from input/output I/O operations on user data stored in storage media of a mass information storage system, comprising the steps of:

writing sequence number metadata with each of a plurality of associated groups of user data to identify a group-write I/O operation which wrote the groups of user data;

writing revision number metadata with the user data to identify a partial-write I/O operation on each of less than all of the groups of user data while other remaining ones of the groups of user data are not written;

writing parity metadata associated with each group of user data to describe each group of user data;

writing separate sequence number metadata, revision number metadata and parity metadata on the storage media at a separate location from the groups of user data, the separate sequence number metadata and revision number metadata being substantial duplicates of the sequence number metadata and revision number metadata associated with each group of user data, the separate parity metadata describing the collective user data of all of the groups;

correcting the user data of any group having an incorrect sequence number which is different from the sequence numbers of two other groups by using the separate parity metadata and user data from the groups having correct sequence numbers; and correcting the user data of any group having an incorrect revision number which occurred before the separate revision number metadata by using the separate parity metadata and the user data from all of the groups having correct revision numbers.

21. A redundant array of independent disks (RAID) mass information storage system, comprising an array controller and at least one redundancy group connected to the array controller, each redundancy group including a plurality of disk drives as storage media and a disk controller connected to the disk drives, the array controller and the disk controller each including a processor executing programmed instructions to detect and correct errors arising from input/output (I/O) operations on user data stored in a full stripe written on the plurality of disk drives of the redundancy group, the processors operatively:

writing sequence number metadata to each of the plurality of disk drives with the user data to identify the stripe which contains the user data collectively written to the plurality of disk drives;

writing revision number metadata to each of the plurality of disk drives with the user data to identify each read modify write I/O operation performed on the user data of a single disk drive after the stripe had been previously written;

writing separate sequence number metadata, revision number metadata and parity metadata to a separate disk drive of the redundancy group as part of the stripe, the separate sequence number metadata and revision number metadata being substantial duplicates of the sequence number metadata and revision number metadata associated with the user data of the stripe contained on each other disk drive of the redundancy group, the separate parity metadata of the separate disk drive describing the all of the user data of the stripe contained on all of the other disk drives;

correcting the user data of the stripe obtained from a disk drive when the user data of the stripe has a sequence number which is different from the sequence numbers of the user data of the stripe obtained from two other disk drives by using the separate parity metadata and user data of the stripe having correct sequence numbers in an error correcting algorithm; and correcting the user data of the stripe obtained from a disk drive when the user data of the stripe has an incorrect revision number which is different from the separate revision number metadata by using the parity metadata obtained from the separate disk drive and the user data from the disk drives of the stripe having correct revision numbers in an error correcting algorithm.

* * * * *